United States Patent Office 3,666,555
Patented May 30, 1972

3,666,555
OXIDATION RESISTANT GRAPHITE AND CARBON SHAPES
Willliam P. Jones, McMurray, Pa., assignor to Dresser Industries, Inc., Dallas, Tex.
No Drawing. Filed Feb. 8, 1968, Ser. No. 703,862
Int. Cl. B44d 1/20
U.S. Cl. 117—228      6 Claims

ABSTRACT OF THE DISCLOSURE

Composite carbon shapes for use at elevated temperatures in an oxidizing atmosphere comprising carbon shapes and a coating comprising particulate aluminosilicate refractory bonded together and to the surface of the carbon shape with phosphoric acid.

BACKGROUND

Graphite and carbon are excellent materials for high temperature use because of their high strength and creep resistance up to at least 2000° C., excellent thermal shock resistance, low density and ease of machining to complex shapes. Their major drawback is that they oxidize at temperatures above 400 to 500° C. forming volatile carbon oxides, and hence, develop no protective oxide layer.

Notwithstanding the tendency of carbon and graphite to oxidize, they are used extensively as refractories and as electrodes in the manufacture of ferrous and nonferrous metals. In iron and steelmaking, carbon refractories are used to line the bottoms of blast furnaces (an application where oxidation is not a factor) and as electrodes in the three-phase Heroult type arc furnaces. Because of the extremely high temperatures reached during the manufacture of electric furnace steel in the Heroult type furnaces, there is no known commercial method for protecting the electrodes from oxidation. Until my invention, it was also thought that there was no known technique for protecting carbon refractories in nonferrous metal-making operations from oxidation either.

Exemplary of the type of nonferrous metal-making process in which carbon refractories, according to the teachings of this invention, can be protected is the manufacture of Misch metal by the electrolysis of rare earth chlorides at temperatures approaching 2400° F. The techniques for the manufacture of Misch metal by electrolysis are explained in detail in chapter 19 entitled "Rare Earth Metals" in the Rare Metals Handbook, 2nd edition, edited by Clifford A. Hampel, and published by Reinhold Publishing Corporation, 1961. The article is hereby incorporated by reference.

Amorphous carbon and graphite electrodes are made in much the same way. Petroleum coke and tar are mixed. The mixture is extruded into shapes which are baked to drive off the volatile constituents. When the shapes are to be graphitized, they are placed in resistance furnaces which reach a temperature above 4000° F. The high temperature treatment converts carbon to graphite and removes more volatile impurities. Graphitization greatly increases the strength and current carrying capacity of carbon shapes. Hereinafter the term carbon is meant to imply both amorphous carbon and its crystalline form, graphite. Attempts to protect carbon shapes and electrodes from carbonization during use at elevated temperatures have tended to be very expensive and noncommercial. For example, it is known that impregnation with antioxygidants such as phosphate, can effect a marked improvement at 500 to 600° C., but for temperatures of 1000° C. and above, such treatment is inadequate. The exotic techniques known for protecting carbon at elevated temperatures are typically characterized by coatings that are applied, for example, by flame spraying or treated at high temperatures. While such expensive measures may be economical for graphite used at temperatures in excess of 3000° F., it is unsuitable for commercial metal-making processes wherein temperatures never exceed about 2500° F.

It is an object of this invention to provide carbon shapes for use at elevated temperatures and in oxidizing atmospheres having an oxidation resistance coating that is applied at room temperature and does not require heat treatment. It is a further object of this invention to provide a method of protecting carbon bodies from oxidation at elevated temperatures by applying to their surface a coating comprising particulate aluminosilicate refractory grain and a phosphoric acid binder. It is yet another object of this invention to provide a more economical method of making Misch metal.

BRIEF DESCRIPTION OF THE INVENTION

Composite carbon (meaning both amorphous carbon and graphite) shapes are protected from oxidation at elevated temperatures by coating them either by spraying or painting or dipping with a slurry comprising particulate aluminosilicate refractory grain having a binder comprising phosphoric acid. Preferably, the coating is applied so it is between ⅛ and 1/16" thick. However, thinner coatings and thicker coatings are suitable. The slurry is prepared by first preparing a batch of sized aluminosilicate refractory grain which should all pass 35 mesh and preferably all pass 200 mesh. By aluminosilicate refractory grain is meant calcined fireclay, calcined diaspore, calcined bauxite, and other calcined hydrated aluminosilicates. Aluminosilicate refractory grain is also meant to refer to kyanite and other nonhydrated natural aluminosilicates. It is preferable, according to this invention, that the slurry comprises from up to 10% of uncalcined clay or bauxite or other known plasticizing ingredients.

According to this invention, a slurry should contain sufficient phosphoric acid in sufficient concentration to provide from 2 to 15%, preferably, 4 to 13% $P_2O_5$ based on the weight of the aluminosilicate grog.

DETAILED DESCRIPTION

Further features and other objects and advantages of this invention will become clear to those skilled in the art by a careful study of the following examples. In this specification and appended claims, all percentages and ratios and parts are by weight, chemical analyses were obtained by spectrographic analysis with control by wet chemical analysis and are reported as oxides in accordance with the present practice of the refractories industry. All sizings are measured with the Tyler screen series.

A manufacturer of Misch metal by the technique of electrolytic decomposition of the fused chloride-rare earth-salt combinations conducted electrolysis in cells that were approximately 24 by 24" inside, 8 cells were grouped together with 12 or 16 carbon electrodes placed in each cell. The carbon electrodes were the cathodes, the electrolytic cells having water cooled metal anodes at their base. The carbon electrodes were approximately 18" long and 4" x 1½" in cross section. The cells were operated at an estimated temperature of about 2400° F. The major problem and cost in this manufacturing process was the rapid wear of the carbon electrodes due to oxidation. Typically, the electrodes lasted about 1 day.

The carbon electrodes were coated according to the teachings of this invention with a slurry prepared as follows: A dry batch comprising 95% calcined South American bauxite sized so that more more than 2% rest on 35 mesh, and at least 50% pass 150 mesh and 5% crude clay and bauxite was prepared. To the dry batch was added 16 parts of 85% concentration phosphoric acid based on 100 parts dry batch. Since 85% concentration phosphoric acid comprises 0.62% $P_2O_5$, the $P_2O_5$ content of the overall batch, exclusive of tempering water, was 9%. The $P_2O_5$ content was calculated as follows:

$$\frac{0.62 \times 16 \text{ (parts phosphoric acid)}}{0.62 \times 16 \text{ (parts phosphoric acid)} + 100 \text{ (parts dry batch)}} \times 100 = 9\% P_2O_5$$

This batch was then tempered with approximately 20% water and brushed on the carbon electrodes leaving the lower 1½" of the electrode uncoated. The coating on the electrodes was air dried and thereafter the electrodes were put in service. It was found that the efficiency of the electrodes was not impaired by the coating but that the life of the electrodes was extended 16 fold. All previous attempts to coat the electrodes failed. The coatings fell away from the electrodes soon after they were placed in service.

It is not entirely understood by the inventor why coatings according to this invention work so well to reduce the oxidation of carbon electrodes. The prior art attempted to form a glassy coating on carbon surfaces with materials such as silicon carbide or low melting glasses. Applicant does not believe that his coatings are oxygen impervious such as those taught by the prior art. They do, however, have an uncanny ability to remain affixed to the carbon surfaces and especially the ability to remain as a unitary coating. This is, perhaps, due to the ability of phosphoric acid to form a bond with aluminosilicates at low temperatures which remains strong up to temperatures in excess of 2000° F. It should be noted that the coatings according to the teachings of this invention need not be fused or baked onto the surface of the carbon shapes. This feature makes coatings according to this invention extremely suitable for commercial applications.

Having thus described the invention in detail, and with sufficient particularity as to enable those skilled in the art to practice it, what is desired to have protected by Letters Patent is set forth in the following claims.

I claim:

1. Carbon shapes for use at elevated temperatures and in oxidizing atmospheres coated with particulate aluminosilicate refractory grain sized to substantially all pass a 35 mesh screen bonded together and to the surface of the carbon shapes with phosphoric acid in sufficient concentration to provide from about 2 to 15% $P_2O_5$ based on the weight of the dry ingredients of the coating.

2. Shapes according to claim 1 in which coating is in excess of 1/16" thick.

3. Shapes according to claim 1 in which the particulate aluminosilicate refractory grain is sized to all pass 200 mesh.

4. Shapes according to claim 1 in which the coating comprises up to 10% uncalcined aluminosilicate.

5. Shapes according to claim 1 in which the coating comprises sufficient phosphoric acid in sufficient concentration to provide from 4 to 13% $P_2O_5$ based on the weight of the dry ingredients of the coating.

6. A method of protecting carbon bodies from oxidation at temperatures in excess of about 1500° F. and below about 2500° F. comprising the steps of:
 (1) preparing a slurry comprising particulate aluminosilicate grain, up to 10% uncalcined aluminosilicates, sufficient phosphoric acid and in sufficient concentration to provide from 2 to 15% $P_2O_5$, based on the weight of the dry ingredients, and from 10 to 30% tempering water,
 (2) applying the coating to the surfaces of the carbon shapes, and
 (3) drying.

References Cited
UNITED STATES PATENTS

| | | | |
|---|---|---|---|
| 3,342,627 | 9/1967 | Paxton et al. | 117—228 X |
| 3,029,167 | 4/1962 | Carlson et al. | 117—228 |
| 1,566,409 | 12/1925 | Lavene | 117—228 X |

ALFRED L. LEAVITT, Primary Examiner

U.S. Cl. X.R.

117—169 A, 169 R, Dig. 11